US011248710B2

(12) United States Patent
Huang et al.

(10) Patent No.: US 11,248,710 B2
(45) Date of Patent: Feb. 15, 2022

(54) SINGLE WATERWAY VALVE CORE STRUCTURE

(71) Applicant: Xiamen Lota International Co., Ltd., Fujian (CN)

(72) Inventors: Xiaodong Huang, Fujian (CN); Chuanbao Zhu, Fujian (CN)

(73) Assignee: Xiamen Lota Intternational Co., Ltd., Xiamen (CN)

( * ) Notice: Subject to any disclaimer, the term of this patent is extended or adjusted under 35 U.S.C. 154(b) by 0 days.

(21) Appl. No.: 17/115,278

(22) Filed: Dec. 8, 2020

(65) Prior Publication Data

US 2021/0173416 A1 Jun. 10, 2021

(30) Foreign Application Priority Data

Dec. 9, 2019 (CN) .......................... 201922189113.1

(51) Int. Cl.
*F16K 3/04* (2006.01)
*F16K 27/04* (2006.01)

(52) U.S. Cl.
CPC .............. *F16K 3/04* (2013.01); *F16K 27/045* (2013.01)

(58) Field of Classification Search
CPC ......... F16K 3/04; F16K 27/045; F16K 5/0414
USPC ........................... 137/801; 251/172, 174, 304
See application file for complete search history.

(56) References Cited

U.S. PATENT DOCUMENTS

| 3,009,679 | A | * | 11/1961 | Williams | F16K 31/52458 251/172 |
| 3,677,516 | A | * | 7/1972 | Hicks | F16K 19/006 251/174 |
| 4,077,426 | A | * | 3/1978 | Karie | F16K 5/0414 137/454.6 |
| 4,577,835 | A | * | 3/1986 | Holycross, Jr. | F16K 5/0414 137/614.11 |
| 4,765,365 | A | * | 8/1988 | Roland | F16K 3/08 137/550 |
| 4,776,565 | A | * | 10/1988 | Sheen | F16K 27/045 251/287 |
| 7,461,669 | B2 | * | 12/2008 | Jonte | F16K 27/045 137/454.5 |

* cited by examiner

*Primary Examiner* — John Bastianelli
(74) *Attorney, Agent, or Firm* — Cooper Legal Group, LLC

(57) ABSTRACT

A single waterway valve core structure comprises a valve housing, a valve cover, a temperature regulating valve rod, a water stop piece, and a hollow water stop pad. A bottom of the valve housing comprises a water inlet cavity, and a side wall of the valve housing comprises a water outlet. The water stop piece is integrally formed on a bottom end of the temperature regulating valve rod, and the bottom end of the temperature regulating valve rod comprises one or more water passing holes. A side wall of the temperature regulating valve rod comprises a side outlet hole in communication with the water outlet. The hollow water stop pad is disposed in the water inlet cavity, the temperature regulating valve rod is disposed in the valve housing, and the water stop piece contacts the hollow water stop pad.

6 Claims, 5 Drawing Sheets

SINGLE WATERWAY VALVE CORE STRUCTURE

RELATED APPLICATIONS

This application claims priority to Chinese patent application number 201922189113.1, filed on Dec. 9, 2019. Chinese patent application number 201922189113.1 is incorporated herein by reference.

FIELD OF THE DISCLOSURE

The present disclosure relates to a single waterway valve core structure.

BACKGROUND OF THE DISCLOSURE

At present, wall mounted shower faucets have been widely used in engineering projects because they occupy less space. As the faucet bodies of the wall mounted shower faucets are mounted in the wall, the faucet bodies are separated from the wall surface by a distance. The existing wall mounted shower faucets usually comprise an ordinary bolt shaft and an adapter rod to ensure a handle space out of the wall. Bolt shafts with stainless steel water stop pieces are used more and more due to lower costs relative to bolt shafts with ceramic cores. The faucet bodies of the wall mounted shower faucets that use the stainless steel water stop pieces need to be processed with eccentric holes. Water stop pads and springs are disposed in the eccentric holes, the bolt shafts with stainless steel water stop pieces are assembled, the adapter rod is added to the bolt shafts with stainless steel water stop pieces, and then a cover of the wall mounted shower faucets is tightly locked. Disadvantages of the faucet structure are as follows.

When the bolt shafts with stainless steel water stop pieces need to be replaced, especially after the faucet bodies have been mounted in the wall, the water stop pads and springs will fall out of the faucet bodies due to there being nothing to restrict them in place, and will often be lost. In addition, the bolt shafts and the stainless steel water stop piece are separated, resulting in an additional installation step and an increased installation time.

BRIEF SUMMARY OF THE DISCLOSURE

The present disclosure provides a single waterway valve core structure to solve the deficiencies in the background.

In order to solve the technical problems, a technical solution of the present disclosure is as follows.

A single waterway valve core structure comprises a valve housing, a valve cover, a temperature regulating valve rod, a water stop piece, a hollow water stop pad, and an elastic member. A bottom of the valve housing comprises a water inlet cavity, and a side wall of the valve housing comprises a water outlet. The water stop piece is integrally formed on a bottom end of the temperature regulating valve rod, and the bottom end of the temperature regulating valve rod comprises one or more water passing holes. A side wall of the temperature regulating valve rod comprises a side outlet hole in communication with the water outlet. The hollow water stop pad is disposed in the water inlet cavity, and the elastic member is disposed between and abuts the hollow water stop pad and a cavity wall of the water inlet cavity. The temperature regulating valve rod is disposed in the valve housing, and the water stop piece contacts the hollow water stop pad. The valve cover covers the temperature regulating valve rod and is connected to the valve housing, and the temperature regulating valve rod extends out of the valve cover. The temperature regulating valve rod is configured to rotate relative to the valve housing to enable the one or more water passing holes to be aligned or staggered with an inner cavity of the hollow water stop pad. When at least one of the one or more water passing holes is aligned with the inner cavity of the hollow water stop pad, water from the water inlet cavity flows into the inner cavity of the hollow water stop pad, flows through the one or more water passing holes and the side outlet hole, and then flows out of the water outlet.

In a preferred embodiment, the one or more the water passing holes comprise two water passing holes symmetrically disposed. The temperature regulating valve rod comprises a water passing cavity in communication with the two water passing holes and the side outlet hole. When one water passing hole of the two water passing holes is aligned with the inner cavity of the hollow water stop pad, the other water passing hole of the two water passing holes and the side outlet hole are in communication with the water outlet.

In a preferred embodiment, a hollow eccentric projecting portion protrudes downward from a bottom end of the valve housing, and a projecting edge protrudes upward from an inner bottom surface of the valve housing. And a mounting area is encompassed between the projecting edge and an inner side wall of the valve housing. The mounting area is in communication with an inner cavity of the hollow eccentric projecting portion. The hollow water stop pad and the elastic member are disposed in the mounting area. The inner cavity of the hollow eccentric projecting portion and the mounting area define the water inlet cavity. When the one water passing hole of the two water passing holes is aligned with the inner cavity of the hollow water stop pad, the other water passing hole of the two water passing holes is in communication with the water outlet through an area of the valve housing excluding the mounting area.

In a preferred embodiment, a top end of the valve housing projects upward to define one or more snap buckles, and the valve cover comprises one or more snap grooves. The valve cover is fixedly connected to the valve housing through a snap connection between the one or more snap buckles and the one or more snap grooves.

In a preferred embodiment, the top end of the valve housing is disposed with one or more positioning blocks, and a lower end of the valve cover comprises one or more positioning grooves configured to cooperate with the one or more positioning blocks.

In a preferred embodiment, the one or more positioning blocks comprise a plurality of positioning blocks, the one or more snap buckles comprise a plurality of snap buckles, and the plurality of positioning blocks and the plurality of snap buckles are annularly and alternatively disposed. The one or more snap grooves comprise a plurality of snap grooves, the one or more positioning grooves comprise a plurality of positioning grooves, and the plurality of snap grooves and the plurality of positioning grooves are annularly and alternatively disposed.

In a preferred embodiment, the single waterway valve core structure comprises a plurality of seal rings. An outer periphery of the temperature regulating valve rod comprises a plurality of grooves, and the plurality of seal rings are disposed between the inner side wall of the valve housing and walls of the plurality of grooves or between an inner side wall of the valve cover and the walls of the plurality of grooves.

Compared with the existing techniques, the technical solution has the following advantages.

1. Since the water stop piece is integrally formed on the bottom end of the temperature regulating valve rod, the difficulty with installing the water stop piece on the temperature regulating valve rod is eliminated and assembly is more convenient. The hollow water stop pad and the elastic member are restricted in the water inlet cavity and define a single, replaceable unit in combination with the valve cover and the valve housing, which can ensure the integrity of the assembly and ensure that it is not easy to lose components.

2. When one of the one or more water passing holes is aligned with the inner cavity of the hollow water stop pad, another one of the one or more water passing holes and the side outlet hole are in communication with the water outlet, so that the area of the water outlet becomes larger to increase the water flow rate.

3. The valve cover is fixedly connected to the valve housing through a snap connection of the one or more snap buckles and the one or more snap grooves, so the connection between the valve cover and the valve housing is convenient.

4. Through the positioning cooperation of the one or more positioning blocks and the one or more position grooves, the valve cover and the valve housing can be quickly aligned, and it is difficult to mistakenly reverse the mounting of the valve cover relative to the valve housing.

DETAILED DESCRIPTION OF THE EMBODIMENTS

Figure 1:
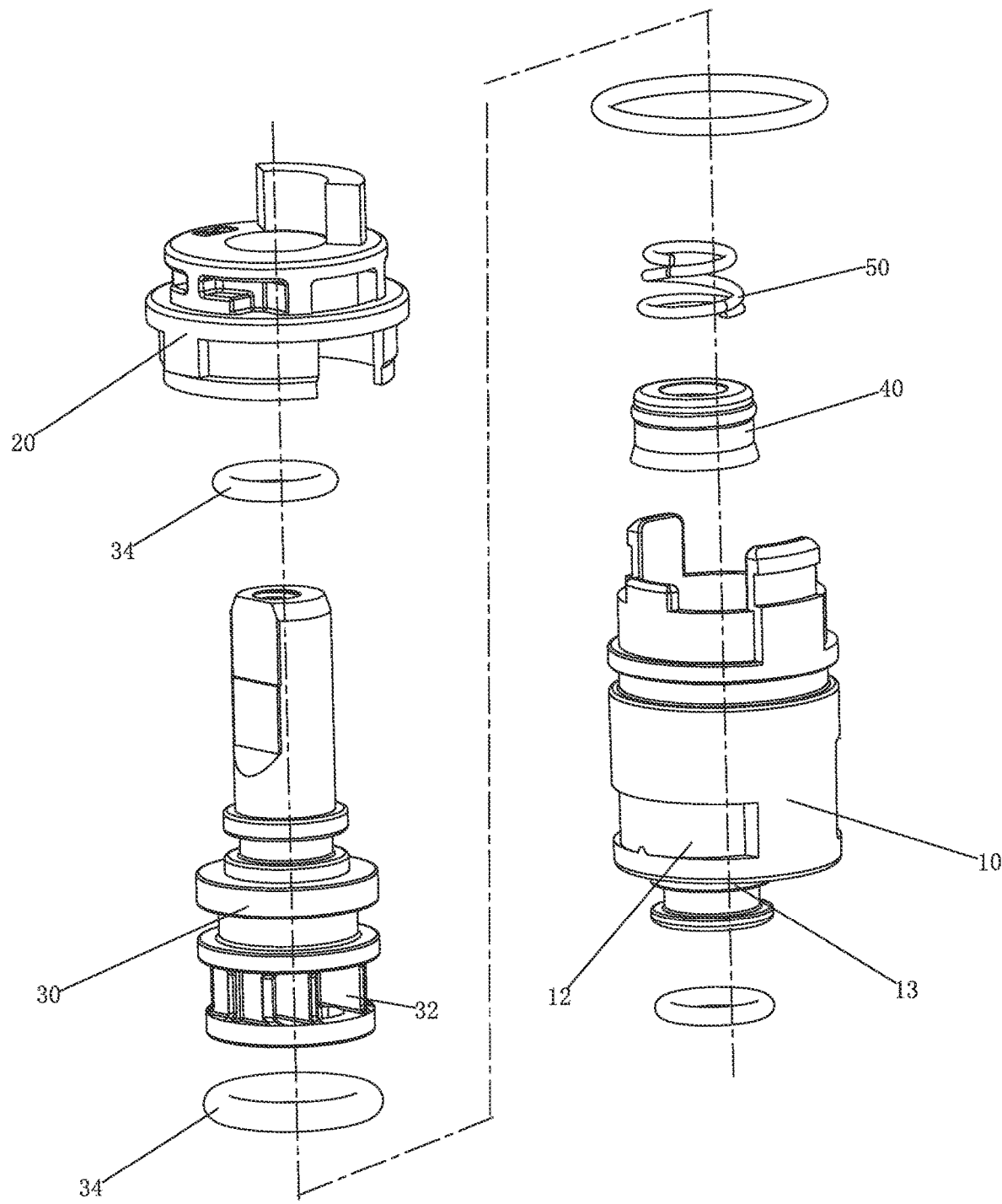
FIG. 1 illustrates an exploded perspective view of a single waterway valve core structure of an embodiment.

The present disclosure will be further described below in combination with the accompanying drawings and embodiments.

Referring to FIGS. 1-8, an embodiment of a single waterway valve core structure comprises a valve housing 10, a valve cover 20, a temperature regulating valve rod 30, a water stop piece 301, a hollow water stop pad 40, and an elastic member 50.

A bottom of the valve housing 10 comprises a water inlet cavity 11, and a side wall of the valve housing 10 comprises a water outlet 12.

In this embodiment, a hollow eccentric projecting portion 13 protrudes downward from a bottom end of the valve housing 10, and a projecting edge 14 protrudes upward from an inner bottom surface of the valve housing 10. A mounting area 15 is encompassed between the projecting edge 14 and an inner side wall of the valve housing 10. The mounting area 15 is in communication with an inner cavity of the hollow eccentric projecting portion 13. The inner cavity of the hollow eccentric projecting portion 13 and the mounting area 15 define the water inlet cavity 11.

The water stop piece 301 is integrally formed on a bottom end of the temperature regulating valve rod 30, and the bottom end of the temperature regulating valve rod 30 comprises one or more water passing holes 31. A side wall of the temperature regulating valve rod 30 comprises a side outlet hole 32 in communication with the water outlet 12. Since the water stop piece 301 is integrally formed on the bottom end of the temperature regulating valve rod 30, the difficulty with installing the water stop piece 301 on the temperature regulating valve rod 30 is minimized (i.e., eliminated) and assembly is convenient.

In this embodiment, the one or more water passing holes 31 comprise two water passing holes symmetrically disposed, and the temperature regulating valve rod 30 is further disposed with a water passing cavity 33 in communication with the two water passing holes 31 and the side outlet hole 32.

The hollow water stop pad 40 is disposed in the water inlet cavity 11, and the elastic member 50 is disposed between and abuts the hollow water stop pad 40 and a cavity wall of the water inlet cavity 11. The temperature regulating valve rod 30 is disposed in the valve housing 10, and the water stop piece 301 contacts (i.e., is pressed) on the hollow water stop pad 40. The valve cover 20 covers the temperature regulating valve rod 30 and is connected to the valve housing 10. The temperature regulating valve rod 30 extends out of the valve cover 20. The temperature regulating valve rod 30 is configured to rotate relative to the valve housing 10, so that the two water passing holes 31 are aligned or staggered with an inner cavity of the hollow water stop pad 40. When at least one water passing hole of the two water passing holes 31 is aligned with the inner cavity of the hollow water stop pad 40, water from the water inlet cavity 11 flows into the inner cavity of the hollow water stop pad 40, flows through the two water passing holes 31 and the side outlet hole 32, and then flows out of the water outlet 12. The hollow water stop pad 40 and the elastic member 50 are restricted in the water inlet cavity 11 and define a single, replaceable unit in combination with the valve cover 20 and the valve housing 10 to ensure integrity of the assembly and to ensure that it is not easy to lose components.

In this embodiment, when one water passing hole 31 of the two water passing holes 31 is aligned with the inner cavity of the hollow water stop pad 40, the other water passing hole 31 of the two water passing holes 31 and the side outlet hole 32 are both in communication with the water outlet 12.

Figure 2:
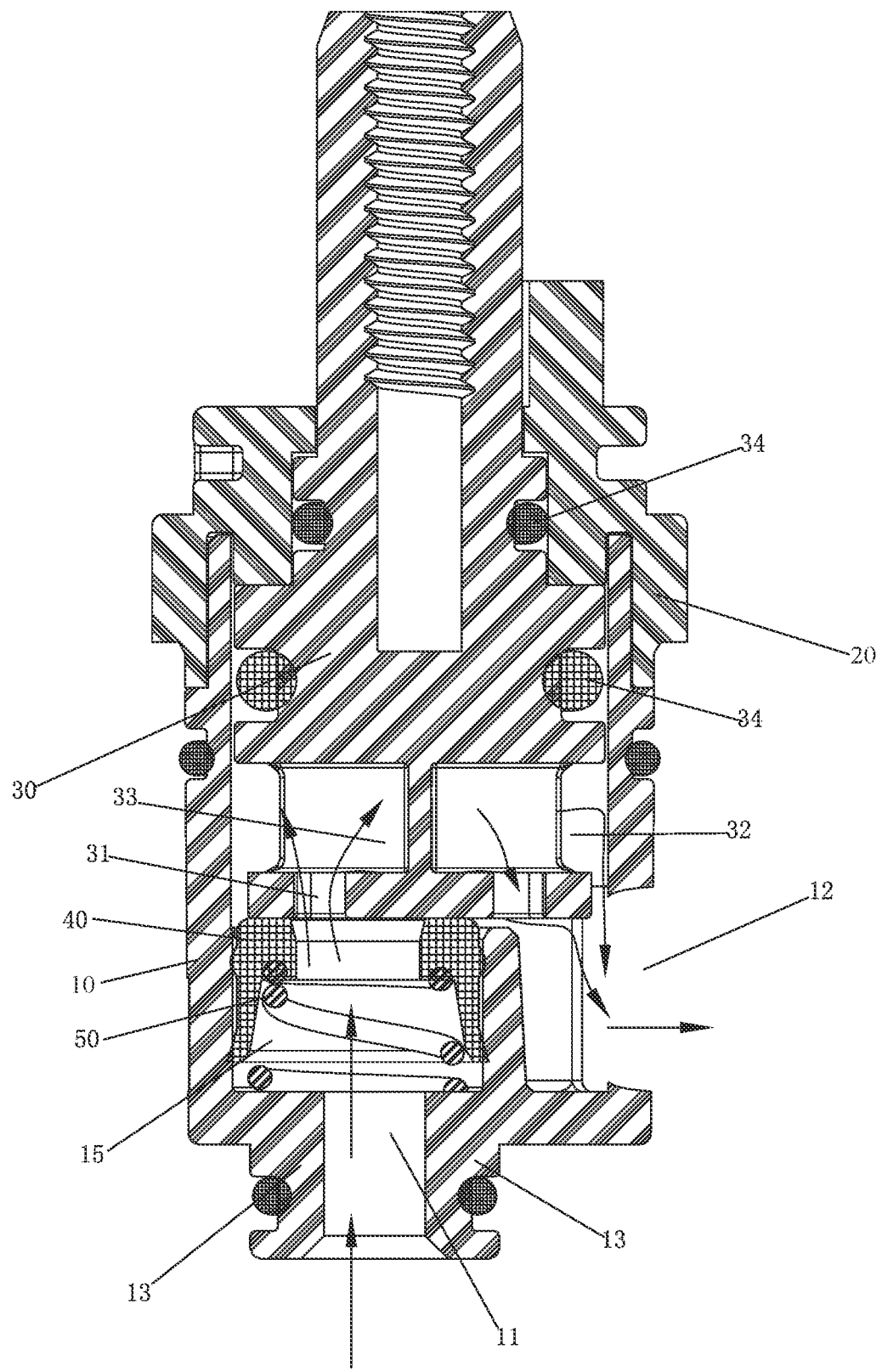
FIG. 2 illustrates a cross-sectional view of the single waterway valve core structure of the embodiment.
Figure 3:
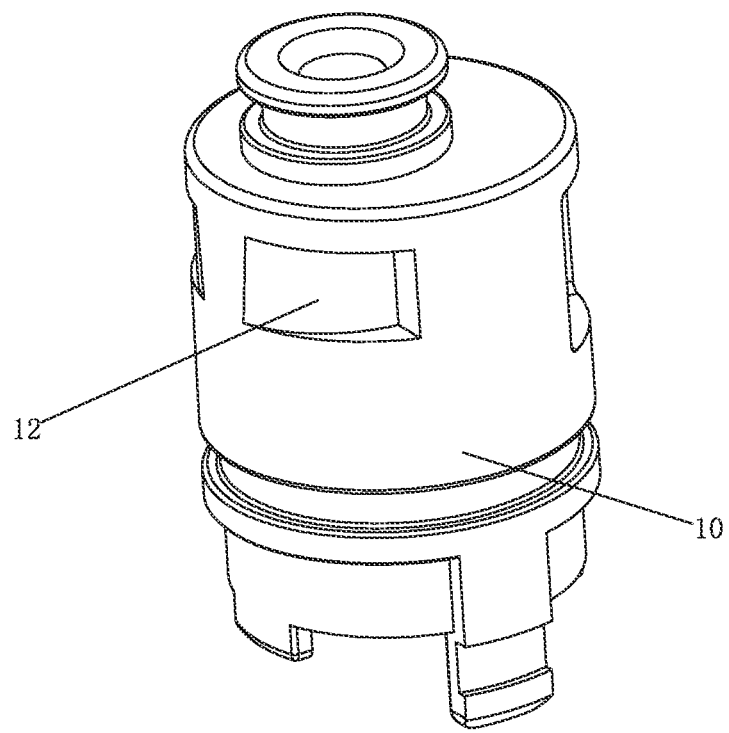
FIG. 3 illustrates a perspective view of a valve housing.
Figure 4:
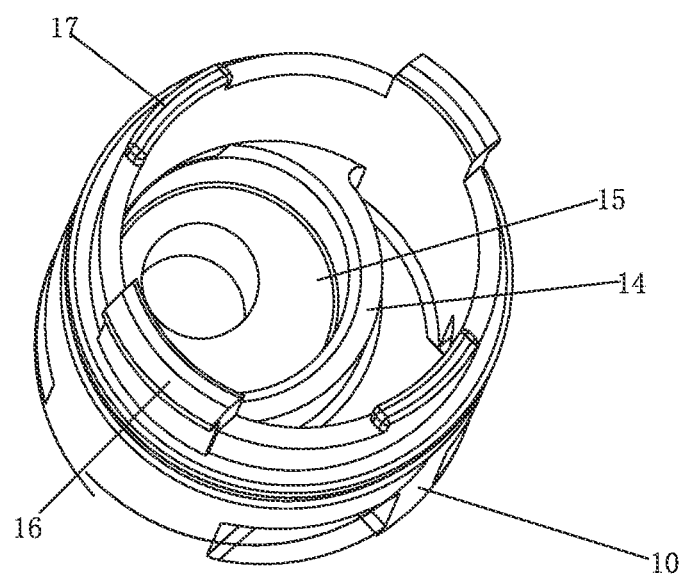
FIG. 4 illustrates a structural view of a bottom of the valve housing.
Figure 5:
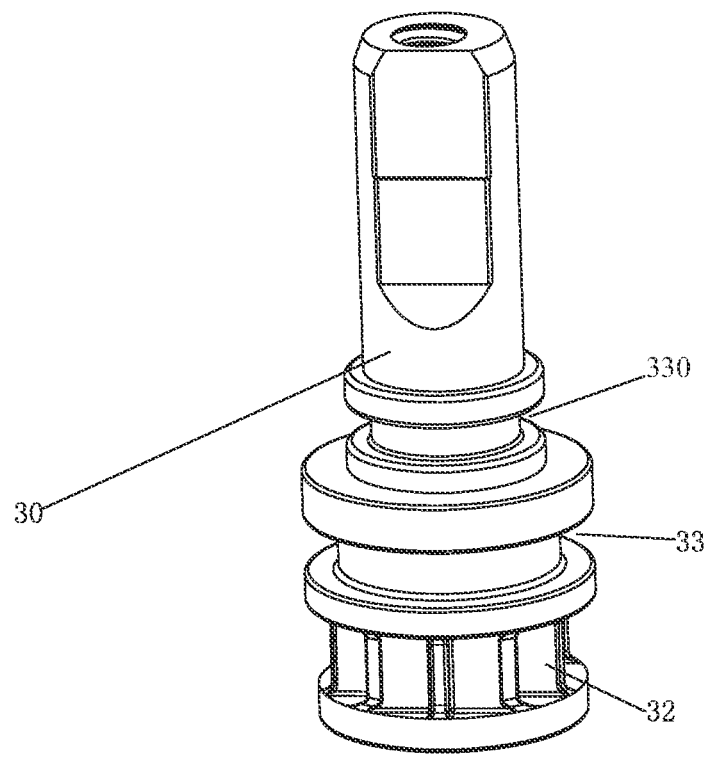
FIG. 5 illustrates a perspective view of a temperature regulating valve rod.
Figure 6:
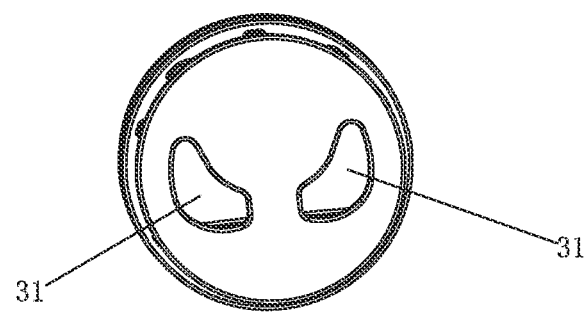
FIG. 6 illustrates a bottom view of the temperature regulating valve rod.
Figure 7:
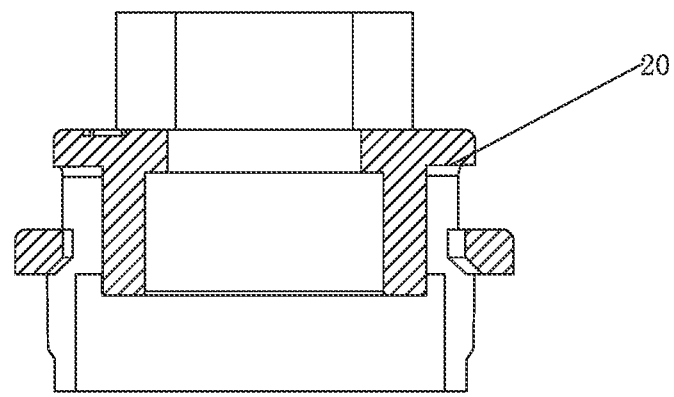
FIG. 7 illustrates a cross-sectional view of a valve cover.
Figure 8:
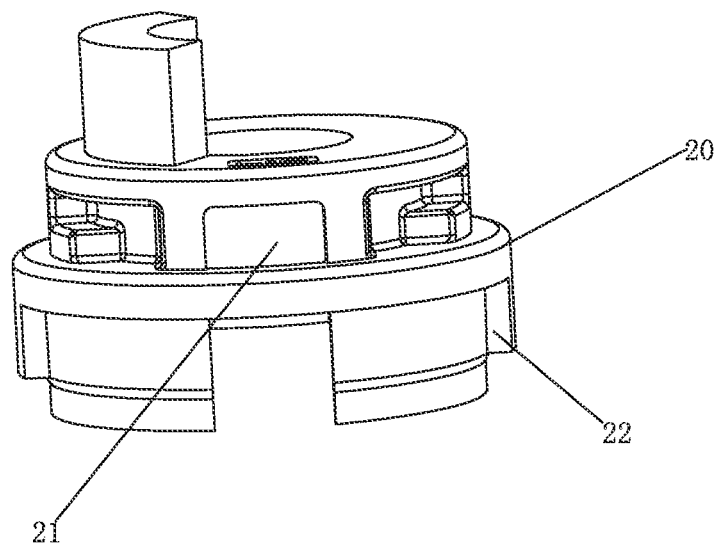
FIG. 8 illustrates a perspective view of the valve cover.

In this embodiment, the hollow water stop pad 40 and the elastic member 50 are disposed in the mounting area 15. Referring to FIG. 2, when one of the water passing holes 31 is aligned with the inner cavity of the hollow water stop pad 40, the other water passing hole 31 of the two water passing holes 31 is in communication with the water outlet 12 through an area of the valve housing 10 excluding the mounting area 15.

In this embodiment, a top end of the valve housing 10 projects upward to define one or more snap buckles 16, and the valve cover 20 comprises one or more snap grooves 21. The valve cover 20 is fixedly connected to the valve housing 10 due to a snap connection between the one or more snap buckles 16 and the one or more snap grooves 21.

In this embodiment, the top end of the valve housing 10 is further disposed with one or more positioning blocks 17, and a lower end of the valve cover 20 comprises one or more positioning grooves 22 configure to cooperate with the one or more positioning blocks 17.

In this embodiment, the one or more positioning blocks 17 comprise two positioning blocks 17, the one or more snap buckles 16 comprise two snap buckles 16, and the two positioning blocks 17 and the two snap buckles 16 are annularly and alternatively disposed. The one or more snap grooves 21 comprise two snap grooves 21, the one or more positioning grooves 22 comprise two positioning grooves 22, and the two snap grooves 21 and the two positioning grooves 22 are annularly and alternatively disposed.

In this embodiment, an outer periphery of the temperature regulating valve rod 30 comprises a plurality of grooves 330. A plurality of seal rings 34 are further provided. The plurality of seal rings 34 are disposed between the inner side wall of the valve housing 10 and walls of the plurality of grooves 330, or the plurality of seal rings 34 are disposed between an inner side wall of the valve cover 20 and the walls of the plurality of grooves 330. Referring to FIG. 2, the plurality of the grooves 330 comprises two grooves 330, the two grooves 330 are disposed in an upper and lower direction (i.e., a vertical direction), and the plurality of seal rings 34 comprises two seal rings. One of the two seal rings 34 is disposed between the inner wall of the valve housing 10 and a wall of a corresponding one of the two grooves 330. The other of the two seal rings 34 is disposed between the inner side wall of the valve cover 20 and a wall of a corresponding one of the two grooves 330.

The aforementioned embodiments are merely some embodiments of the present disclosure, and the scope of the disclosure of is not limited thereto. Thus, it is intended that the present disclosure cover any modifications and variations of the presently presented embodiments provided they are made without departing from the appended claims and the specification of the present disclosure.

What is claimed is:

1. A single waterway valve core structure, comprising:
   a valve housing,
   a valve cover,
   a temperature regulating valve rod,
   a water stop piece,
   a hollow water stop pad, and
   an elastic member, wherein:
     a bottom of the valve housing comprises a water inlet cavity,
     a side wall of the valve housing comprises a water outlet,
     the water stop piece is integrally formed on a bottom end of the temperature regulating valve rod,
     the bottom end of the temperature regulating valve rod comprises one or more water passing holes,
     a side wall of the temperature regulating valve rod comprises a side outlet hole in communication with the water outlet,
     the hollow water stop pad is disposed in the water inlet cavity,
     the elastic member is disposed between and abuts the hollow water stop pad and a cavity wall of the water inlet cavity,
     the temperature regulating valve rod is disposed in the valve housing,
     the water stop piece contacts the hollow water stop pad,
     the valve cover covers the temperature regulating valve rod and is connected to the valve housing,
     the temperature regulating valve rod extends out of the valve cover,
     the temperature regulating valve rod is configured to rotate relative to the valve housing to enable the one or more water passing holes to be aligned or staggered with an inner cavity of the hollow water stop pad, and
     when at least one of the one or more water passing holes is aligned with the inner cavity of the hollow water stop pad:
       water from the water inlet cavity flows into the inner cavity of the hollow water stop pad, flows through the one or more water passing holes and the side outlet hole, and then flows out of the water outlet, and
     the one or more the water passing holes comprise two water passing holes symmetrically disposed, the temperature regulating valve rod comprises a water passing cavity in communication with the two water passing holes and the side outlet hole, and when one water passing hole of the two water passing holes is aligned with the inner cavity of the hollow water stop pad: the other water passing hole of the two water passing holes and the side outlet hole are in communication with the water outlet.

2. The single waterway valve core structure according to claim 1, wherein:
   a hollow eccentric projecting portion protrudes downward from a bottom end of the valve housing,
   a projecting edge protrudes upward from an inner bottom surface of the valve housing,
   a mounting area is encompassed between the projecting edge and an inner side wall of the valve housing,
   the mounting area is in communication with an inner cavity of the hollow eccentric projecting portion,
   the hollow water stop pad and the elastic member are disposed in the mounting area,
   the inner cavity of the hollow eccentric projecting portion and the mounting area define the water inlet cavity, and
   when the one water passing hole of the two water passing holes is aligned with the inner cavity of the hollow water stop pad:
     the other water passing hole of the two water passing holes is in communication with the water outlet through an area of the valve housing excluding the mounting area.

3. The single waterway valve core structure according to claim 2, wherein:
   a top end of the valve housing projects upward to define one or more snap buckles,
   the valve cover comprises one or more snap grooves, and
   the valve cover is fixedly connected to the valve housing through a snap connection between the one or more snap buckles and the one or more snap grooves.

4. The single waterway valve core structure according to claim 3, wherein:
   the top end of the valve housing is disposed with one or more positioning blocks, and
   a lower end of the valve cover comprises one or more positioning grooves configured to cooperate with the one or more positioning blocks.

5. The single waterway valve core structure according to claim 4, wherein:
   the one or more positioning blocks comprise a plurality of positioning blocks,
   the one or more snap buckles comprise a plurality of snap buckles,
   the plurality of positioning blocks and the plurality of snap buckles are annularly and alternatively disposed, the one or more snap grooves comprise a plurality of snap grooves, the one or more positioning grooves comprise a plurality of positioning grooves, and the plurality of snap grooves and the plurality of positioning grooves are annularly and alternatively disposed.

6. The single waterway valve core structure according to claim 5, comprising:

a plurality of seal rings, wherein:

an outer periphery of the temperature regulating valve rod comprises a plurality of grooves, and the plurality of seal rings are disposed between the inner side wall of the valve housing and walls of the plurality of grooves or between an inner side wall of the valve cover and the walls of the plurality of grooves.

* * * * *